United States Patent
Sung et al.

(10) Patent No.: US 9,014,728 B2
(45) Date of Patent: Apr. 21, 2015

(54) METHOD AND APPARATUS FOR OPERATING CALL FUNCTION OF PORTABLE TERMINAL

(75) Inventors: Jung Sic Sung, Yongin-si (KR); Young Jip Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 799 days.

(21) Appl. No.: 13/223,616

(22) Filed: Sep. 1, 2011

(65) Prior Publication Data

US 2012/0052915 A1    Mar. 1, 2012

(30) Foreign Application Priority Data

Sep. 1, 2010  (KR) .................. 10-2010-0085525

(51) Int. Cl.
*H04W 4/16* (2009.01)
*H04M 1/725* (2006.01)

(52) U.S. Cl.
CPC ...... *H04M 1/72519* (2013.01); *H04M 1/72552* (2013.01); *H04M 1/72583* (2013.01); *H04M 1/72597* (2013.01); *H04M 2250/22* (2013.01)

(58) Field of Classification Search
USPC .......... 455/464, 415, 417–419; 370/352, 310, 370/356, 465
See application file for complete search history.

(56) References Cited

U.S. PATENT DOCUMENTS

| | | |
|---|---|---|
| 2009/0007017 A1 | 1/2009 | Anzures et al. |
| 2009/0042602 A1 | 2/2009 | Nagata et al. |
| 2009/0249247 A1 | 10/2009 | Tseng et al. |
| 2010/0210250 A1 | 8/2010 | Luke et al. |
| 2010/0210293 A1 | 8/2010 | Lim et al. |
| 2010/0226362 A1* | 9/2010 | Kim et al. ............... 370/352 |

FOREIGN PATENT DOCUMENTS

| | | |
|---|---|---|
| EP | 2 219 350 A1 | 8/2010 |
| EP | 2 219 354 A2 | 8/2010 |
| WO | 2009-097555 A2 | 8/2009 |

\* cited by examiner

*Primary Examiner* — Sam Bhattacharya
(74) *Attorney, Agent, or Firm* — Jefferson IP Law, LLP

(57) ABSTRACT

A method for operating a call function of a portable terminal that may simply execute a call function while operating various applications, and intuitively provide a call relation interface, and an apparatus thereof, are provided. The method for operating a call function, includes displaying a call interface in which a phone number is automatically input when interaction is input to the call item, and executing a call function using the phone number when a call transmission interaction is input from the call interface.

20 Claims, 13 Drawing Sheets

FIG. 10
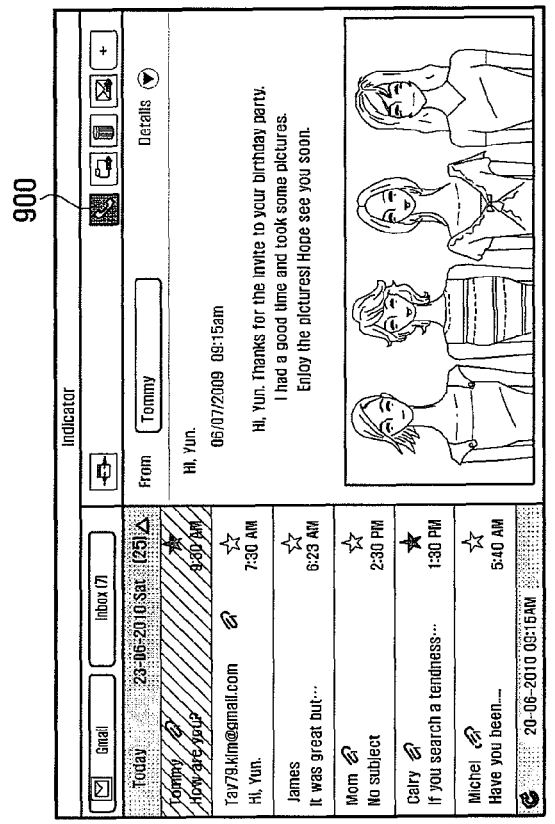
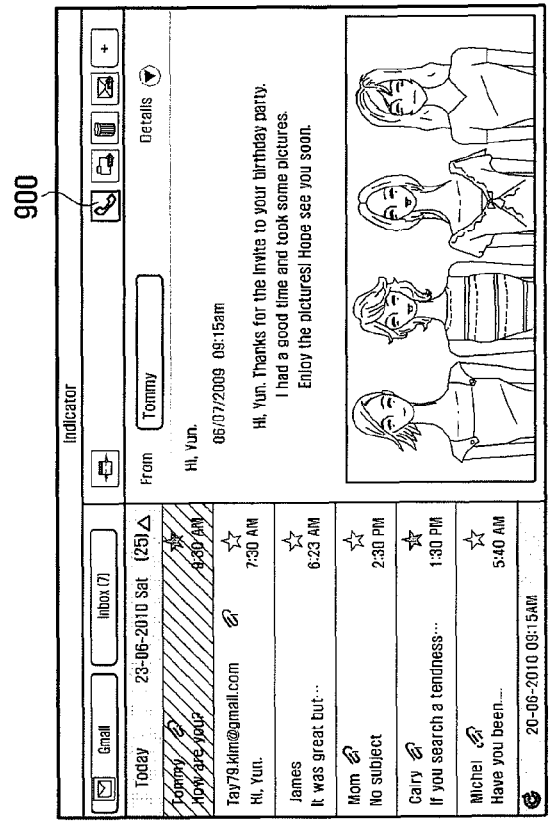

METHOD AND APPARATUS FOR OPERATING CALL FUNCTION OF PORTABLE TERMINAL

PRIORITY

This application claims the benefit under 35 U.S.C. §119 (a) of a Korean patent application filed on Sep. 1, 2010 in the Korean Intellectual Property Office and assigned Serial No. 10-2010-0085525, the entire disclosure of which is hereby incorporated by reference.

BACKGROUND OF THE INVENTION

1. Field of the Invention:

The present invention relates to a portable terminal having a call function. More particularly, the present invention relates to a method and apparatus for operating a call function of a portable terminal that may simply execute a call function while operating various applications, and intuitively provide a call relation interface.

2. Description of the Related Art:

With the advancements in information and communication technologies and semiconductor technologies, the supply and use of all types of portable terminals have rapidly increased. In particular, recent portable terminals reflect a convergence of traditional communications functions and other functions. As a representative example of the portable terminals, a mobile communication terminal provides various functions such as a TeleVision (TV) watching function (e.g., mobile broadcasting such as Digital Multimedia Broadcasting (DMB) or Digital Video Broadcasting (DVB)), a music playing function (e.g., Moving Picture Experts Group (MPEG)-1 or MPEG-2 Audio Layer-3 (MP3)), a photographing function, and an Internet access function as well as a general communication function such as speech call or message transmission/reception.

Meanwhile, to execute a call function while operating various applications in a portable terminal of the related art, after an executed application is terminated, a call interface is called to execute a call function or a call interface is called by multi-tasking to execute the call function. Further, in the portable terminal of the related art, after calling a call interface, the call interface may directly input contact information (e.g., a phone number of another portable terminal) of a target for executing a call function, or execute a call function by searching contact information registered in a phone-book. However, the user may experience inconvenience when executing a call function during operation of a certain application in a portable terminal of the related art.

Furthermore, when the user of the portable terminal of the related art intends to respond to a message received while using an electronic service, the user may easily respond using a message. However, responding to the message using a call to a user that transmitted the message would be inconvenient because a call function would have to be executed according to the procedure described above.

SUMMARY OF THE INVENTION

Aspects of the present invention are to address at least the above-mentioned problems and/or disadvantages and to provide at least the advantages described below. Accordingly, an aspect of the present invention is to provide an additional function and a user interface for convenience of a user of a portable terminal.

Another aspect of the present invention is to provide a portable terminal and a method for controlling the same that may display a call item for executing a call function on an execution screen of a certain application.

Another aspect of the present invention is to provide a portable terminal that may automatically input and display contact information (e.g., a phone number) of a contact designated in a certain application in a call interface when a call item is selected while operating the certain application, and a method for controlling the same.

Another aspect of the present invention is to provide a portable terminal that may answer to a contact selected on an electronic mail screen while providing an electronic mail service with a call function other than an electronic mail, and a method for controlling the same.

Still another aspect of the present invention is to provide an optimal interface environment capable of executing a call function intuitively and simply while operating a certain application.

Still another aspect of the present invention is to provide an optimal environment capable of simply executing a response to a received electronic mail with a call function based on contact information of a contact selected on an electronic mail screen with a call function while providing an electronic mail service to improve utilization and convenience of a portable terminal.

In accordance with an aspect of the present invention, a method for operating a call function is provided. The method includes displaying an execution screen of an application and a call item provided on one region of the execution screen, displaying a call interface in which a phone number is automatically input when an interaction is input to the call item, and executing a call function using the phone number when a call transmission interaction is input from the call interface.

In accordance with another aspect of the present invention, a non-transitory computer readable recording medium having recorded thereon a program for executing the method for operating a call function in a processor is provided.

In accordance with another aspect of the present invention, a portable terminal is provided. The terminal includes a display unit for displaying an execution screen of an application, a call interface screen for executing a call function, and a call screen according to execution of the call function, and a controller for constructing and controlling to display the call interface screen based on contact information extracted from the execution screen when a screen is converted to the call interface screen during an operation of the execution screen, and for constructing and controlling to display the call screen based on setting information when executing a call function on the call interface screen.

As illustrated above, in a method and an apparatus for operating a call function of a portable terminal, a portable terminal and a method for operating the same are provided to automatically input phone numbers upon converting a call function while operating various applications and providing a screen according to a call function. Exemplary embodiments of the present invention may be implemented by various devices having a call function.

In accordance with another aspect of the present invention, a call item is provided on an execution screen of a certain application (e.g., e-mail, browsing, or scheduler). When a call function according to a call item is requested while operating a certain application, a call interface automatically inputs and displays contact information of a contact designated in a certain application as a transmitting phone number. Further, when a call interface is provided, object information (e.g., various contact information registered in a phone book, execution screen of application, contact information extracted from detailed information of application execution screen) may be displayed together. In particular, a user may simply answer a received e-mail while using an e-mail service with an e-mail or call transmission according to contact information. Exemplary embodiments of the present invention may be implemented in an interface environment capable of being intuitively or efficiently operated for activation of a call function while operating various applications to improve utilization, convenience, and competitiveness of the portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 10 is a view illustrating a call item operation in a portable terminal according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
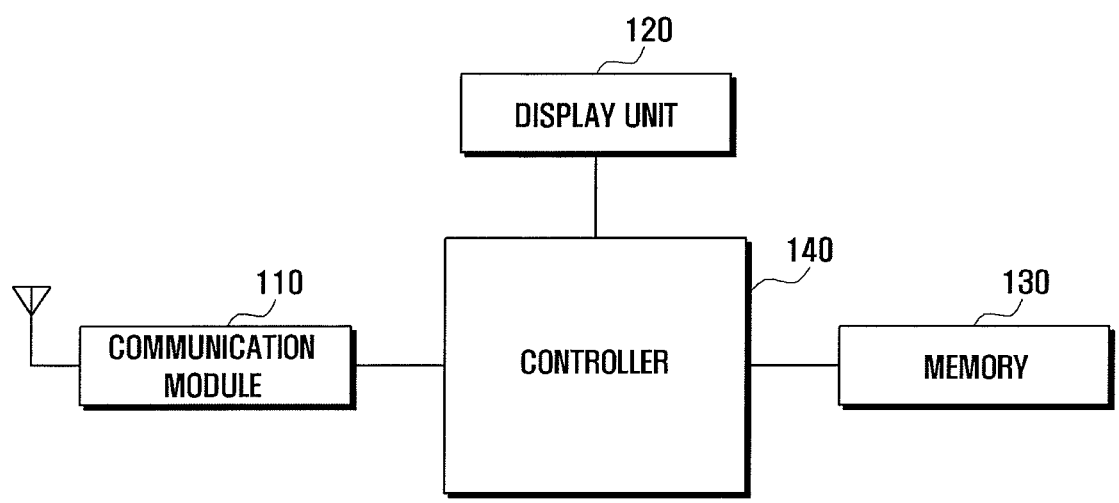
FIG. 1 is a block diagram illustrating a configuration of a portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus capable of operating a call function intuitively and efficiently while operating an application in a portable terminal having a call function. The application according to an exemplary embodiment of the present invention may include an application for an e-mail function, an application for a browsing function, an application for a scheduler function, an application for a message function, an application for an electronic book (e-book) function, an application for a digital broadcasting playback function, etc. Further, a call item for operating a call function together with an execution screen according to execution of an application as illustrated above may be displayed according to an exemplary embodiment of the present invention. Hereinafter, a method for providing a call function using a call item on an execution screen (e.g., an e-mail execution screen) of an application for an e-mail function according to an exemplary embodiment of the present invention will be described.

Accordingly, hereinafter, a configuration of a portable terminal and a method for controlling an operation thereof according to an exemplary embodiment of the present invention will be described with reference to the drawings. However, because a configuration of a portable terminal and a method for controlling an operation thereof according to an exemplary embodiment of the present invention are not limited to the following exemplary embodiments, it should be noticed that various exemplary embodiment are applicable based on the following exemplary embodiments.

FIG. 1 is a block diagram illustrating a configuration of a portable terminal according to an exemplary embodiment of the present invention.

Referring to FIG. 1, the portable terminal includes a communication module 110, a display unit 120, a memory 130, and a controller 140. Besides these, although the portable terminal may further include an audio processing unit having a microphone and a speaker, a digital broadcasting module performing reception and playback of digital broadcasting (e.g., mobile broadcasting such as Digital Multimedia Broadcasting (DMB) or Digital Video Broadcasting (DVB)), a camera module for photo/moving image taking functions, a Bluetooth communication module for performing a Bluetooth communication function, and a touch pad for input based on a touch, etc, a description thereof and an illustration in FIG. 1 are omitted for conciseness.

The communication module 110 supports services such as mobile communication based mobile communication service and a Wireless Local Area Network (WLAN) based Internet service (e.g., a Wi-Fi service). That is, the communication module 110 may be one of a Radio Frequency (RF) module for executing a mobile communication function and a WLAN module for executing a WLAN based Internet communication function corresponding to a communication function supported by the portable terminal Although FIG. 1 shows only one communication module 110, the portable terminal may include both of an RF module for a mobile communication service and a WLAN module for an Internet service. In addition, the portable terminal may communicate with a network through the RF module to support the mobile communication service and the Internet service.

The display unit 120 provides execution screens of applications supported by the portable terminal. For example, the display unit 120 provides executions screens for a message function, an e-mail function, an Internet function, a multimedia function, a search function, a communication function, an electronic book (e.g., e-book) function, a photo/moving image taking functions, a photo/moving image playback functions, a Television (TV) playback function (e.g., a playback function of mobile broadcasting such as Digital Multimedia Broadcasting (DMB) or Digital Video Broadcasting (DVB)), a music playback function (e.g., Moving Picture Experts Group (MPEG)-1 or MPEG-2 Audio Layer-3 (MP3) playback function), a widget function, a memo function, a game function, etc.

A Liquid Crystal Display (LCD) may be used as the display unit 120. However, other display devices such as an Organic Light Emitting Diode (OLED) or an Active Matrix OLED (AMOLED) may be used as the display unit 120. When the display unit 120 displays the foregoing execution screen, it may provide a horizontal mode or a vertical mode according to a rotation direction (or set direction) of the portable terminal.

In an exemplary embodiment of the present invention, the display unit 120 may include an interface supporting a touch based input. For example, the display unit 120 may support a touch based user interaction input by a touch screen configuration and generate and transfer an input signal according to the user interaction input to the controller 140. Further, in an exemplary embodiment of the present invention, when providing an interface (e.g., a call interface) according to a call function, the display unit 120 may divide and output the interface screen into at least two regions. The at least two regions may include an object region and a dialer region. The display unit 120 displays contact information (e.g., registered contact information) registered in a phone book with respect to a certain contact designated on execution screens of an application through the object region, contact information (e.g., parsing contact information) extracted by detailed information parsing of the execution screens, and one of the execution screens on the object region, and a screen for transmitting a call on the dialer region. At this time, according to an exemplary embodiment of the present invention, when a call function is operated that is associated with an application, a representative phone number extracted from the registered contact information may be automatically input in the dialer region to be displayed.

In addition, the display unit 120 may display a screen controlled according to a user interaction input from an application execution screen as described previously. A configuration of a screen displayed on the display unit 120 and a configuration of a screen controlled according to user interaction will be described in an example of an operation below.

The memory 130 stores various programs and data executed and processed by the portable terminal, and may be configured by at least one volatile memory device and nonvolatile memory device. For example, the memory 130 may continuously or temporarily store an Operating System (OS) of the portable terminal, programs and data associated with a display control operation of the display unit 120, programs and data associated with an input control operation using the display unit 120, and programs and data associated with an operation of a call function. In particular, the memory 130 may store information (e.g., contact information) about at least one contact registered by a phone-book menu and a contact list composed of at least one contact. Further, the memory 130 may store e-mail related data (e.g., e-mail contents, attached files, e-mail sender information, and the like) transmitted and received by an e-mail function. In addition, the memory 130 may store various setting information (e.g., setting information with respect to a call screen scheme or a screen converting display scheme) previously set associated with an operation of a call function according to an exemplary embodiment of the present invention.

The controller 140 controls an overall operation of the portable terminal. The controller 140 may control an interface display according to a call function of an exemplary embodiment of the present invention and an operation of the interface display. For example, the controller 140 may control to display a call item for executing a call function on one region of the execution screen together with an execution screen according to execution of an application. When interaction according to the call item is input, the controller 140 may call and control to display a call interface. At this time, the controller 140 may divide and control to display the call interface into an object region and a dialer region to be described below. In particular, upon providing the dialer region, the controller 140 may automatically input and control to display a representative phone number based on contact information extracted at an input time point of the interaction. Further, call transmitting interaction is input from the call interface, the controller 140 may process a call function based on the representative phone number and control to display a call screen according thereto. The call screen may be displayed in a full screen form or together with object information through a divided region. Further, the controller 140 may control screen conversion to an execution screen of a previously executed application in a state that a call function maintains by a screen conversion function on the call screen. A control operation of the controller 140 is described herein in the context of an example of an operation of the portable terminal and a method for controlling the same.

Besides this, the controller 140 performs various control operations associated with a general function of the portable terminal For example, upon execution of an application, the controller 140 may control an operation of the application and data display. Further, the controller 140 may receive input signals corresponding to various input schemes supported from a touch based input interface and control a function operation according thereto. Moreover, the controller 140 may control additional function operations that process transmission and reception of data (e.g., transmission and reception of messages) according to utilization of an Internet service (e.g., e-mail and the like) supported based on WLAN or mobile communication, and track transmitted and received data to output them as a list.

Meanwhile, the portable terminal illustrated in FIG. 1 is applicable to various types of portable terminals such as a bar type, a folder type, a slide type, a swing type, and a flip type of portable terminal. Further, the portable terminal of an exemplary embodiment of the present invention may include various information communication devices, multi-media devices and application devices with respect thereto. For example, the portable terminal may include a Personal Computer (PC), a Portable Multimedia Player (PMP), a digital broadcasting player, a Personal Digital Assistant (PDA), a music player (e.g., MP3 player), a portable game terminal, a net-book computer, and a Smart Phone as well as mobile communication terminals operating based on respective communication protocols corresponding to various communication systems.

Figure 2:
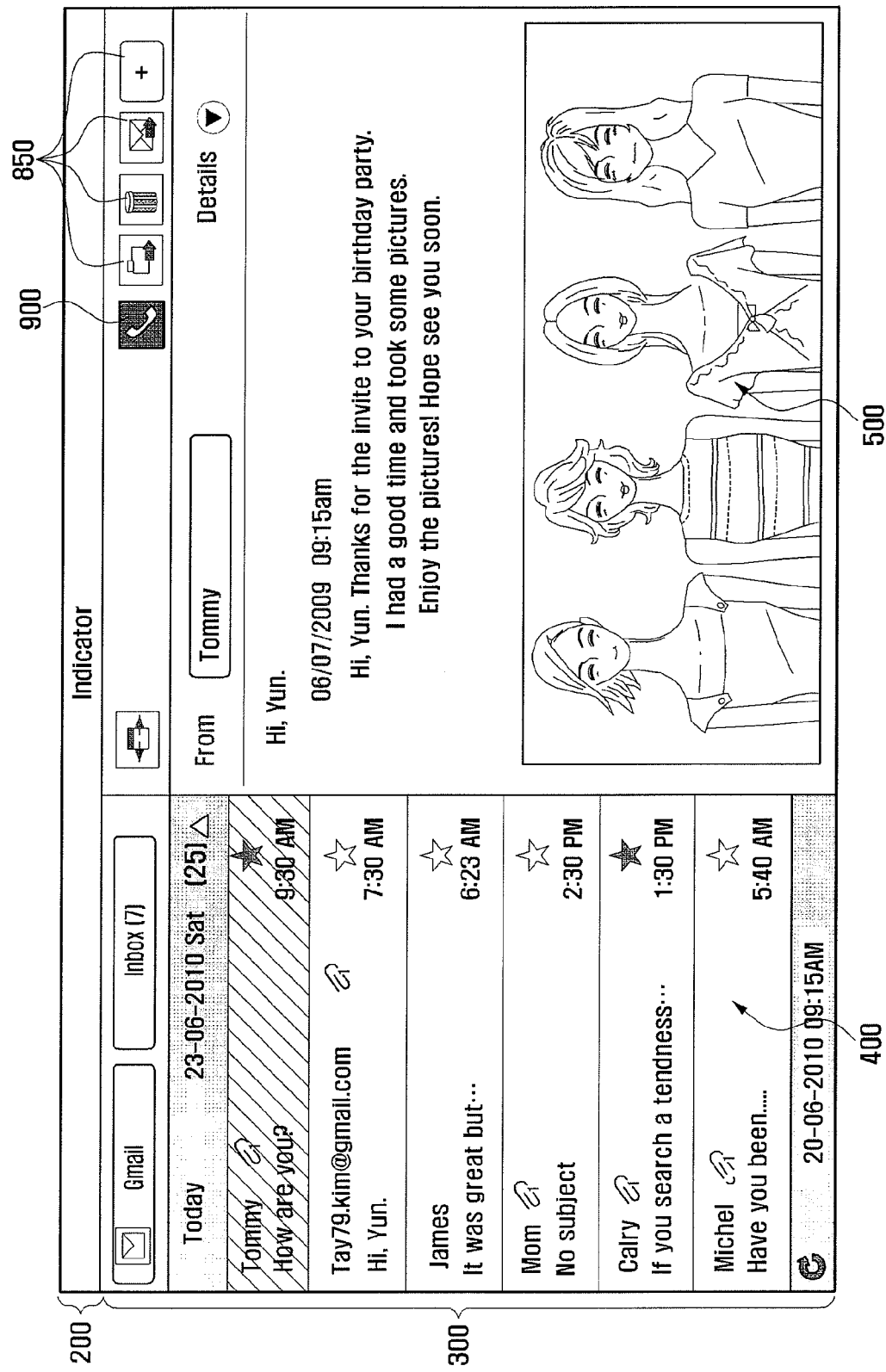
FIG. 2 and FIG. 3 are views illustrating examples of an application execution screen provided by a portable terminal according to an exemplary embodiment of the present invention.
Figure 3:
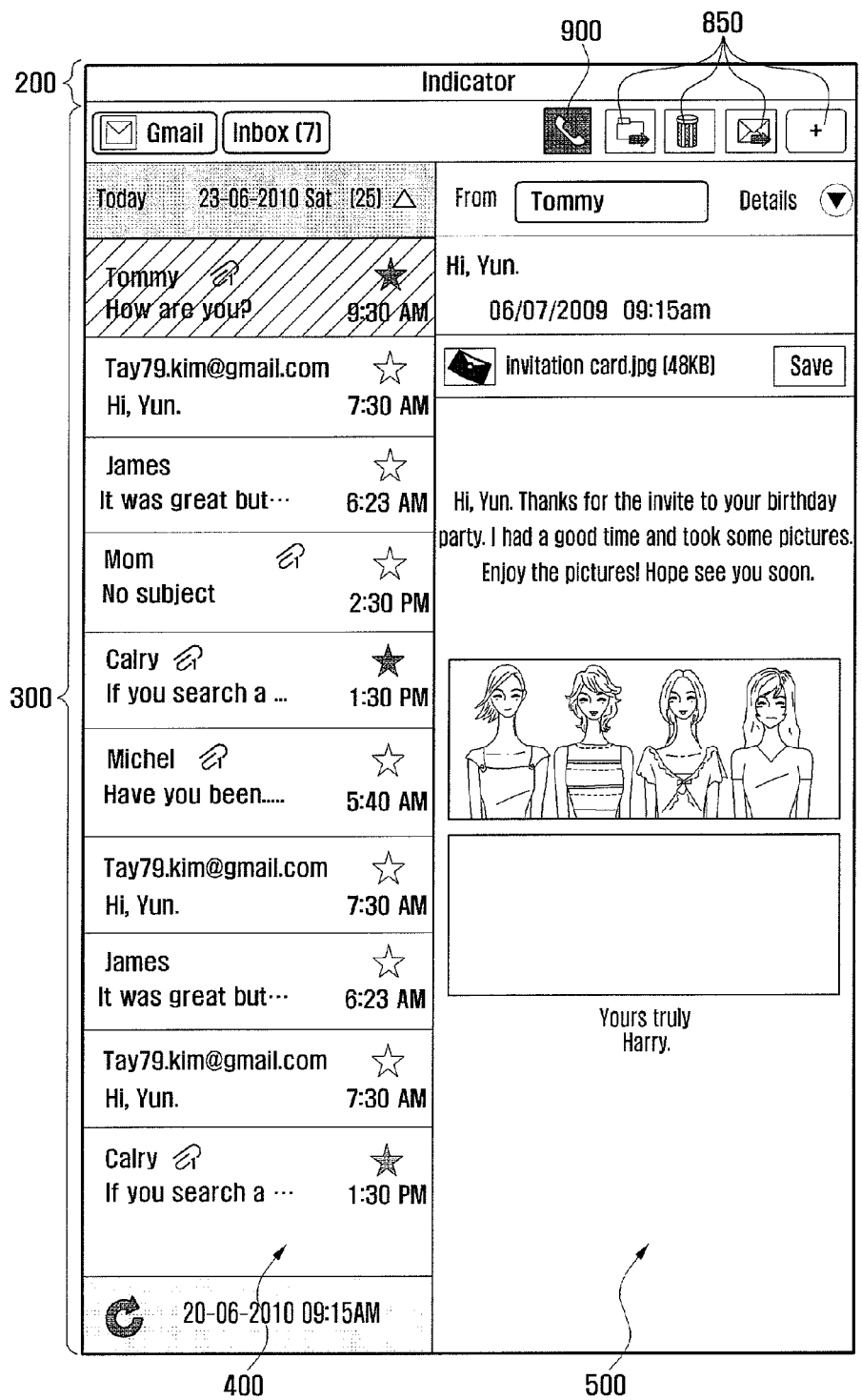

FIG. 2 and FIG. 3 are views illustrating examples of an application execution screen provided by a portable terminal according to an exemplary embodiment of the present invention. In particular, FIG. 2 and FIG. 3 show examples of an execution screen according to execution of an e-mail function in a portable terminal, FIG. 2 shows an example of an e-mail execution screen in a horizontal mode, and FIG. 3 shows an example of an e-mail execution screen in a vertical mode.

Referring to FIG. 2 and FIG. 3, a display unit 120 according to an exemplary embodiment of the present invention may be divided into an indicator region 200 and an execution screen region 300.

The indicator region 200 is a region for providing state information of a portable terminal. In an exemplary embodiment of the present invention, the state information is provided as items such as static images, dynamic images and texts in the indicator region 200, and at least one state information item may be displayed on the indicator region 200. For example, the state information item may include an item indicating signal strength associated with communication, an item indicating reception of messages, an item indicating vibration/sound/mute information, an item indicating Wi-Fi activation/inactivation setting states, an item indicating charging (or remaining amount) state of a battery, an item indicating time information, etc. One or plural items of the plural items may be arranged on the indicator region 200 according to a use environment of a portable terminal as illustrated previously. The foregoing state information item is merely one example, but various items other than the foregoing items may be provided.

The execution screen region 300 is a region for providing a screen according to an application executed in the portable terminal. For example, the execution screen region 300 may display an e-mail execution screen according to execution of an e-mail function in an exemplary embodiment of the present invention as shown in FIG. 2 and FIG. 3. The following is a configuration of an execution screen (e.g., e-mail execution screen) of an application according to an exemplary embodiment of the present invention.

Referring to FIG. 2 and FIG. 3, the e-mail execution screen of an exemplary embodiment of the present invention is provided through at least two divided regions in a horizontal mode as shown in FIG. 2 or through at least two divided regions in a vertical mode as shown in FIG. 3. Although not shown in FIG. 2 and FIG. 3, the foregoing execution screen may be provided through one region regardless of specific regions.

In an exemplary embodiment of the present invention, the e-mail execution screen may be divided into two regions, namely, a list view region 400 and a detail view region 500. An exemplary embodiment of the present invention may display a list (e.g., list of contacts according to reception of e-mail) of upper depth through the list view region 400, and detailed information about a certain contact included in the list of upper depth through the detail view region 500.

In an exemplary embodiment of the present invention, the detail information may indicate detail information (e.g., e-mail contents received from a corresponding contact) associated with certain contact of a contact list of the list view region 400. Referring to FIG. 2 and FIG. 3, the list view region 400 may indicate a list of contacts with respect to an e-mail received using the portable terminal, and the detail view region 500 may indicate e-mail contents (e.g., texts, images, and the like) received from a certain contact (e.g., Tommy) designated in the list of contacts.

In the meantime, in an exemplary embodiment of the present invention, upon providing an execution screen as illustrated above, a call item 500 may be displayed on one region of an execution screen. For example, as shown in FIG. 2 and FIG. 3, a call item 900 is displayed at an upper side of a detail view region 500 together with icons 850 associated with an operation of an e-mail function. In an exemplary embodiment of the present invention, the call item 900 may be displayed at a previously allotted optional region by execution screens of various applications, and conversion to a call interface screen is possible according to selection of the call item 900.

In particular, in an exemplary embodiment of FIG. 2 and FIG. 3, the call item 900 may be displayed to be activated (e.g., embossing display with highlight) or inactivated (e.g., engraving display without highlight) according to whether contact (e.g., Tommy) selected from the list view region 400 includes contact information (in particular, phone number information). For example, when at least one phone number of a certain contact (e.g., Tommy) selected from a corresponding list view region 400 is registered by a phone-book menu, the call item 900 may be engraved and displayed in a highlight way. This allows a user to intuitively know whether the selected contact has contact information. According to an exemplary embodiment of the present invention, conversion to a call interface screen according to user interaction input is possible regardless of activation/inactivation of the call item 900.

Meanwhile, according to an exemplary embodiment of the present invention, when a user interaction is input to the call item 900 to be provided together with an execution screen as shown in FIG. 2 and FIG. 3, it may be converted to a call interface screen. The examples will be explained in further detail with reference to FIG. 4, FIG. 5, and FIG. 6.

Figure 4:
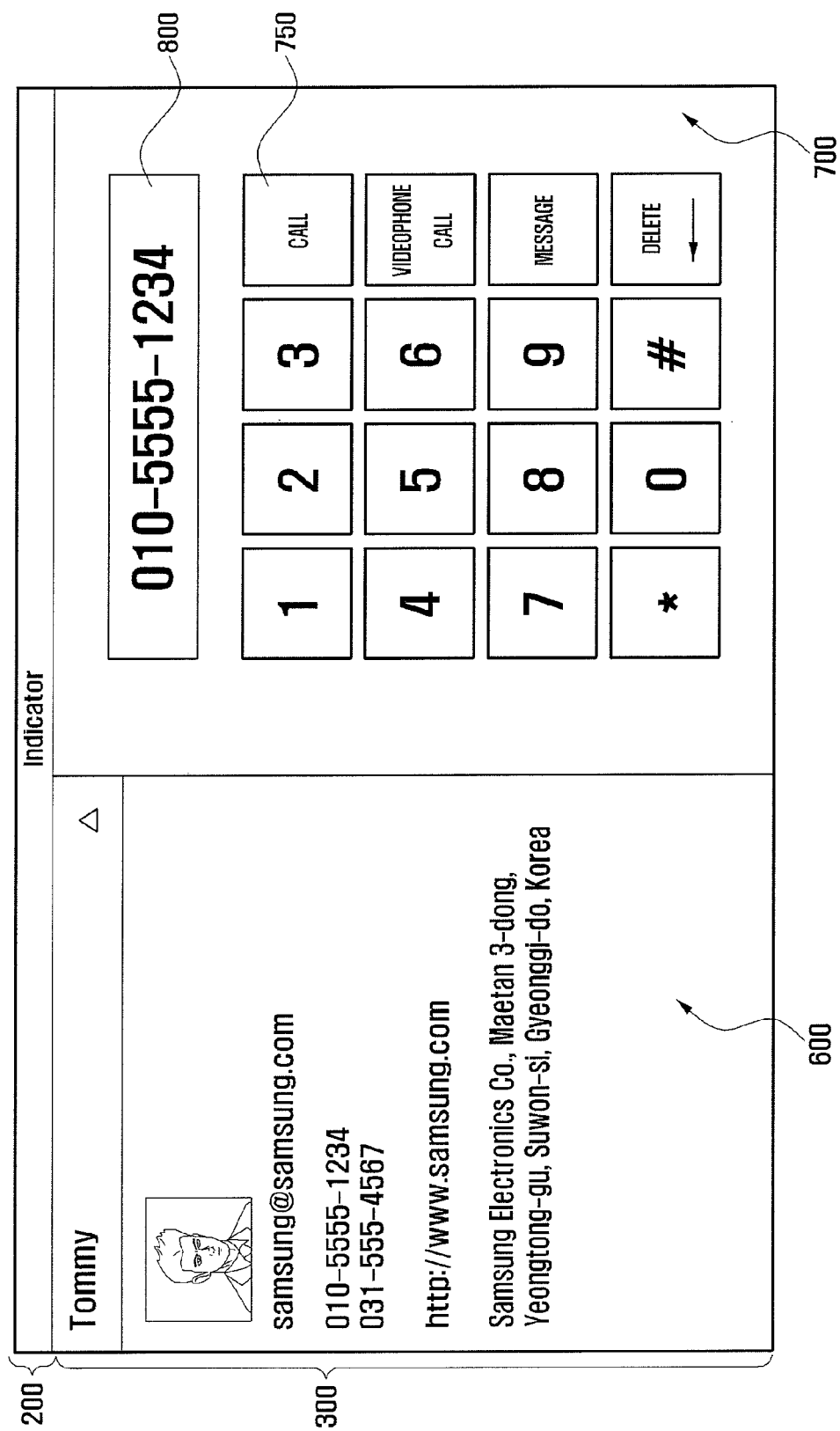
FIG. 4, FIG. 5, and FIG. 6 are views illustrating examples of a call interface screen provided by a portable terminal according to an exemplary embodiment of the present invention.
Figure 5:
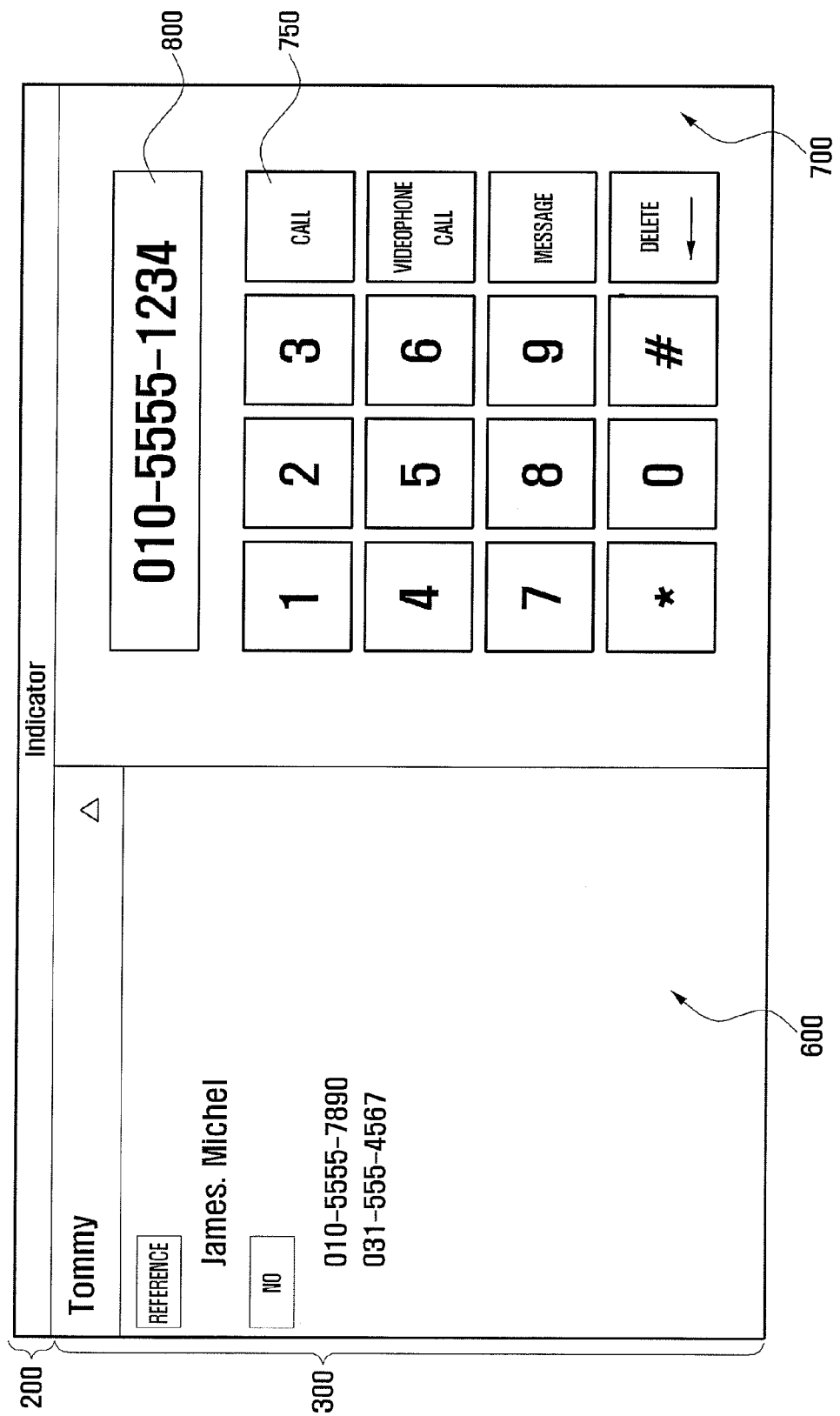
Figure 6:
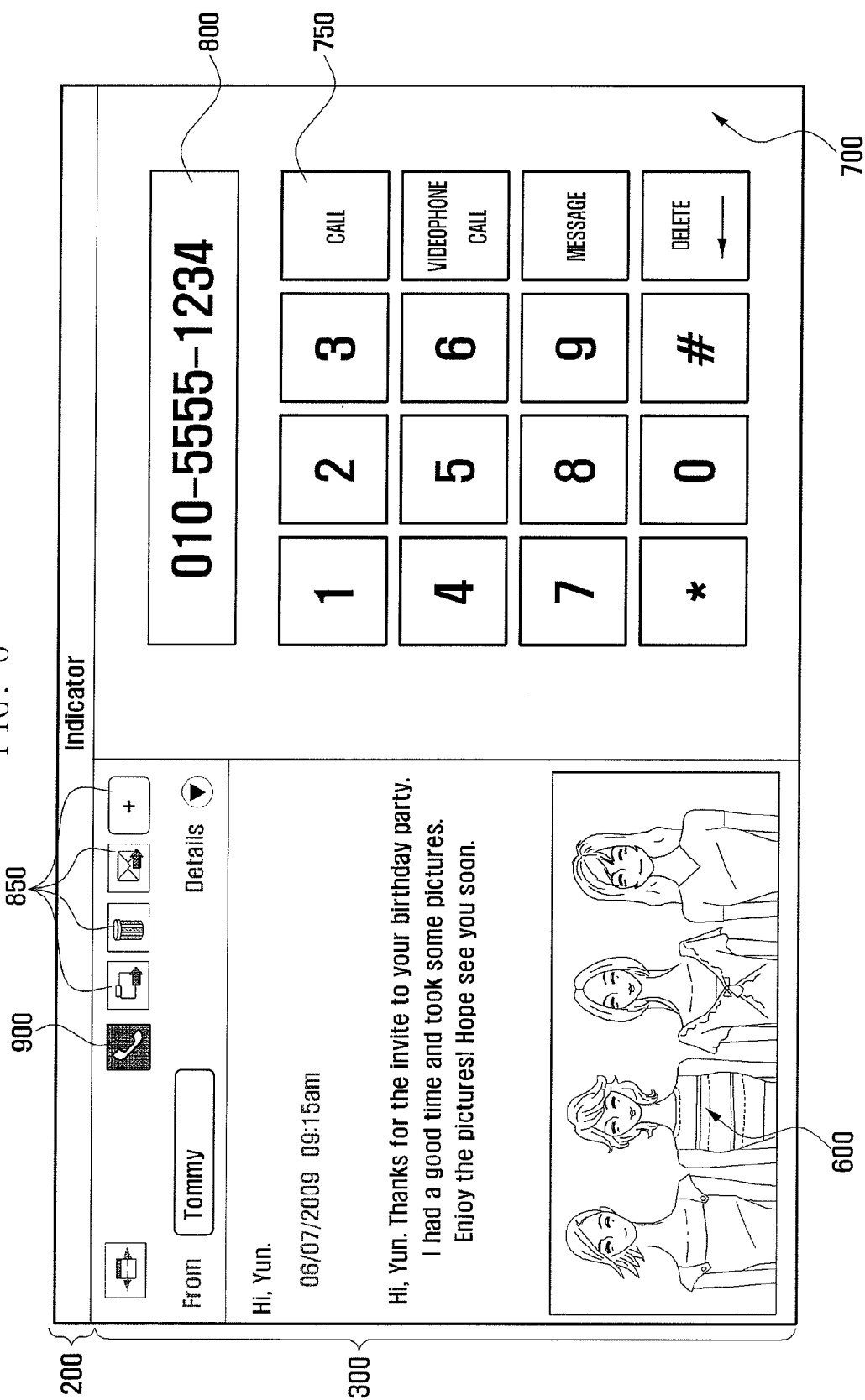

FIG. 4, FIG. 5, and FIG. 6 are views illustrating examples of a call interface screen provided by a portable terminal according to an exemplary embodiment of the present invention.

As shown in FIG. 4, FIG. 5, and FIG. 6, the display unit 120 may be divided into an indicator region 200 and the execution screen region 300, and a call interface screen may be displayed on the execution screen region 300, wherein the call interface screen may be divided into an object region 600 and a dialer region 700.

In an exemplary embodiment of the present invention, the object region 600 is a region to which contact information (i.e., registered contact information; illustrated screen of FIG. 4) associated with a contact selected from FIG. 2 or FIG. 3, contact information (i.e., parsing contact information; illustrated screen of FIG. 5) extracted from e-mail contents (i.e., detail information) received from a contact (e.g., Tommy) in FIG. 2 or FIG. 3, or an e-mail execution screen (illustrated screen of FIG. 6) is provided. In all of the e-mail execution screens shown in FIG. 2 or FIG. 3, a contact list of a list view region 400, or detail information of a detail view region 500 may be provided to the e-mail execution screen provided through the object region 600 according to a method for operating a call function of an exemplary embodiment of the present invention as shown in FIG. 6. Hereinafter, registered contact information displayed on the object region 600, parsing contact information, and an e-mail execution screen refer to object information, and a screen displayed on the object region 600 refers to an object screen.

The dialer region 700 may be divided into an input region 750 and a display region 800. The input region 750 is a region on which a virtual key pad for dialing is displayed. The display region 800 is a region on which a phone number of a certain contact for transmitting a call is input and displayed.

For example, it is assumed that a certain contact (e.g., Tommy) is selected from the list view region 400 of FIG. 2, and accordingly e-mail contents received from the certain contact (e.g., Tommy) are output from a detail view region 500. If a user inputs user interaction selecting a call item 900 in the foregoing state, a call interface may be displayed as shown in FIG. 4 to FIG. 6 according to a call function operation scheme.

Referring to FIG. 4, interaction by a call item 900 may be input on a certain execution screen (e.g., e-mail execution screen) to display the object region 600 and the dialer region 700. Contact information previously registered in the portable terminal with respect to a certain contact (e.g., Tommy) selected from the list view region 400 may be displayed on the object region 600 in FIG. 4. In FIG. 4, the contact information may contain user images, user names, various user phone numbers (e.g., mobile communication phone numbers, home phone numbers, office phone numbers, etc.), e-mail addresses, and link contact information (e.g., IDentifier (ID) information, memo information of other users sharing messengers, facebook information, and twitter information associated with the certain contact based on an Internet service) according to utilization of an Internet service. Further, the dialer region 700 may be displayed when a virtual key pad is displayed through an input region 750 and a phone number (e.g., a representative phone number) set with respect to the contact among the contact information through the display region 800 is automatically input. At this time, when contact selected from an execution screen is not registered in the portable terminal or does not have contact information (in particular, phone numbers), the display region 800 may be displayed as a blank. When the display region 800 is provided as the blank, a user may directly input a certain phone number using a virtual key pad of the input region 750. Moreover, it is apparent to remove or correct a phone number automatically input in the display region 800.

Referring to FIG. 5, when interaction according to a call item 900 is input on a certain execution screen (e.g., e-mail execution screen), an object region 600 and a dialer region 700 may be displayed. In FIG. 5, parsed contact information from e-mail contents displayed on a detail view region 500 may be displayed on the object region 600. It is assumed in FIG. 5 that the e-mail contents include reference information such as 'James' and 'Michel' according to transmission of e-mail information, and phone numbers such as '010-5555-7890' and '031-555-4567'. Beside these, the e-mail contents may contain a variety of information such as name card information mapped to a phone number. Accordingly, the contact information extracted from FIG. 5 may include phone numbers (e.g., 02-5555-7890, 031-555-4567) included in e-mail contents, and reference information (in particular, user names, e-mail addresses, and the like) for receiving the e-mail contents, e.g., James, Michael). The dialer region 700 may be displayed when a virtual key pad is displayed through an input region 750, and a phone number (e.g., a representative phone number) set with respect to the contact among the contract information is automatically input. At this time, as illustrated in FIG. 4, when selected contact is not registered in the portable terminal or does not have contact information (in particular, phone number), the display region 800 may be displayed as a blank.

Referring to FIG. 6, when interaction according to a call item 900 is input on a certain execution screen (e.g., an e-mail execution screen), an object region 600 and a dialer region 700 may be displayed. In FIG. 6, a detail information (namely, e-mail contents) screen indicated on a detail view region 500 may be displayed on the object region 600. Although not shown in FIG. 6, a contact list screen indicated on the list view region 400 may be displayed on the object region 600, or a contact list screen of a list view region 400 and an e-mail contents screen of a detail view region 500 may be simultaneously displayed on the object region 600. The dialer region 700 may be displayed when a virtual key pad may be displayed through an input region 750, a phone number (e.g., representative phone number) set with respect to the contact among the contact information may automatically be input. At this time, as illustrated in FIG. 4, if a selected contact is not registered in the portable terminal or does not have contact information (in particular, phone numbers), the display region 800 may be displayed as a blank.

Meanwhile, although drawings and descriptions thereof are omitted in FIG. 4, it is apparent that a function operation using contact information provided through the object region 600 is possible in an exemplary embodiment of the present invention. For example, referring to FIG. 4, when a user inputs an interaction selecting an e-mail address (e.g., samsung@samsung.com) among contact information displayed on the object region 600, the controller may execute an application (e.g., an e-mail application) mapped to corresponding contact information (e.g., an e-mail address) and control to display a screen associated therewith. Further, when the user inputs an interaction selecting a home page address (e.g., http://www.samsung.com) among the contact information, the controller may execute an application (e.g., a browser application) mapped to corresponding contact information (e.g., a home page address) and control to display a screen associated therewith.

Moreover, when call transmission through direct input of a user is achieved according to providing the display region 800 as a blank, that is, when a call function is executed based on a phone number according to user input, the input phone number may be registered as contact information (e.g., a representative phone number) of the selected corresponding contact. At this time, the contact information may be registered at an execution time point of the call function or an end time point after executing the call function automatically or a manual setting operation of a user. At this time, when a contact selected from an execution screen is not registered or does not have contact information (in particular, phone numbers), the display region 800 may be displayed as a blank. When the display region 800 is provided as the blank, a user may directly input a certain phone number using a virtual key pad of the input region 750. Further, it is apparent to remove or correct phone numbers automatically input in the display region 800.

Moreover, when call transmission is achieved on a call interface screen as shown in FIG. 4 to FIG. 6, a call screen may be provided according to a previously defined setting scheme. For example, the previously defined setting scheme is a scheme for providing a call screen as a full screen form, a total execution screen of the display may be displayed as a call screen. Meanwhile, when the previously defined setting scheme is a scheme for providing a call screen as a division screen, a call screen may be displayed on the dialer region 700 while maintaining an object information display state of the object region 600. Accordingly, a user may perform a call function while viewing a screen displayed on the object region 600. For example, the user may perform a speech call or an image call with another user corresponding to a contact while confirming an e-mail.

Figure 7:
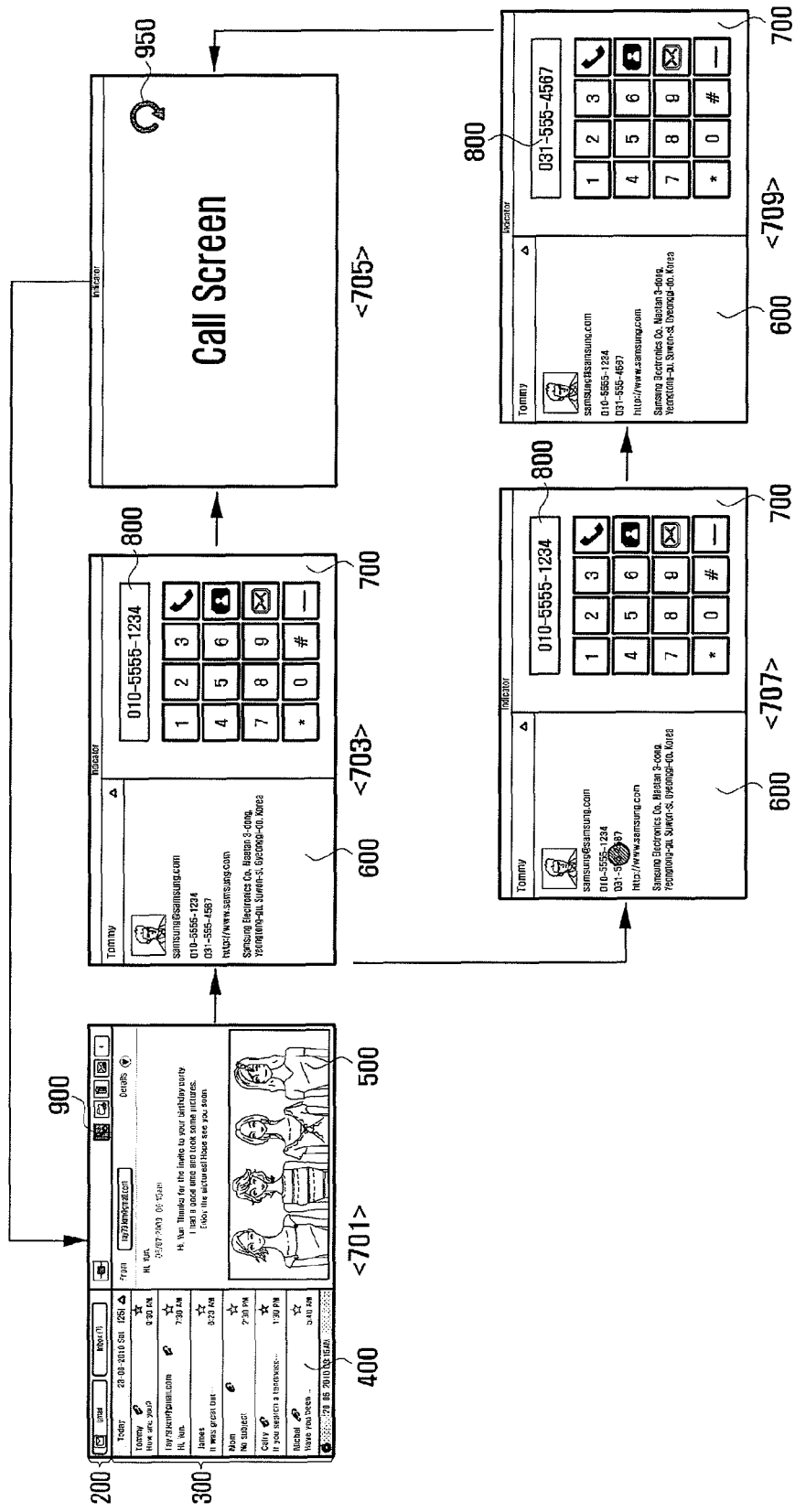
FIG. 7 is a view illustrating a call function operation associated with an application in a portable terminal according to an exemplary embodiment of the present invention.

FIG. 7 is a view illustrating a call function operation associated with an application in a portable terminal according to an exemplary embodiment of the present invention.

Referring to FIG. 7, it is assumed that a display unit 120 is divided into an indicator region 200 and an execution screen region 300 as illustrated in reference numeral 701, and an e-mail execution screen is displayed on the execution screen region 300 and a call item 900 is displayed at one region of the e-mail execution screen. Further, it is assumed that the e-mail execution screen is divided into a list view region 400 and a detail view region 500 as illustrated in reference numeral 701, and e-mail contents received from specific contact according to selection of a user among contacts displayed on the list view region 400 are displayed on the detail view region 500.

Next, in a state of reference numeral 701, the user may perform an input interaction (e.g., a tap interaction) based on a touch selecting a call item 900. For example, the user may answer to a certain contact selected from contacts of a list while using an e-mail function with the execution screen as a call transmission other than an e-mail transmission. Accordingly, the user may input a tap interaction selecting the call item 900.

Accordingly, the controller 140 may convert the screen to a call interface screen and control to display the call interface screen as illustrated in reference numeral 703 from the state of reference numeral 701. At this time, when the screen is converted to the call interface screen, the controller 140 may determine a display scheme thereof. Further, the controller 140 may control to display a call interface screen in a determined scheme. For example, the object region 600 is configured by one of screens of the object region 600 as illustrated in FIG. 4 to FIG. 6 to be displayed. Here, the controller 140 may perform extraction of contact information registered with contact selected according to a scheme for configuring the object region 600, extraction of contact information included in e-mail contents, or an operation of configuring a part of all of an e-mail execution screen on the object region 600 as shown in FIG. 6. Further, the controller 140 may automatically input and control to display contact information (in particular, a phone number) of a corresponding contact on a display region 800 of a dialer region 700.

Next, a user may input an interaction requesting call transmission using contact information displayed on the dialer region 700 in a state of reference numeral 703. For example, the user may input a tap interaction on a 'call' button or an 'image call' button of a virtual key pad displayed on a dialer region 700.

Accordingly, the controller 140 may convert the screen to a call screen as shown in reference 705 in a state of reference numeral 703 and control to display it. Here, the call screen may be a call screen corresponding to a speech call according to a type of a call request of a user or a call screen corresponding to an image call. Further, when the screen is converted to the call screen, the controller 140 may determine a scheme for providing the call screen. Further, the controller 140 may control to display the call screen in a full screen form or a division screen form according to the determined scheme. An example of a screen thereof and an exemplary embodiment of an operation thereof will be described below.

Meanwhile, a user may input an interaction selecting certain contact information (in particular, a phone number) from an object region 600 as shown in reference numeral 707 from a state of reference numeral 703. For example, the user may input an interaction (e.g., a tap interaction) selecting contact information displayed such as '031-555-4567' from the object region 600 as shown in reference numeral 707. Accordingly, the controller 140 substitutes contact information (e.g., 010-555-1234) displayed on a display region of a dialer region 700 as shown in reference numeral 709 from a state of reference numeral 707 by contact information (e.g., 031-555-4567) selected from the object region 600 and controls to display the substituted contact information. That is, the controller 140 may remove '010-555-1234' contact information from the display region 800, and automatically input and control to display '031-555-4567' contact information on the display region.

Next, a user may input an interaction requesting call transmission using contact information displayed on a dialer region 700 in a state of reference numeral 709. Accordingly, the controller 140 may convert the screen to a call screen (call screen according to speech call or image call) as illustrated in reference numeral 705 as illustrated above from a state of reference numeral 709 and control to display the converted call screen.

In the meantime, a call screen as illustrated in reference numeral 705 may be a call screen according to an image call or a speech call. Further, the call screen may be converted to an execution screen (e.g., an e-mail execution screen) of an application which is executed according to selection of a user or automatically and previously. For example, a user may input an interaction (e.g., a tap interaction) requesting screen conversion using a conversion item 950 displayed on a call screen in a state of reference numeral 705.

In an exemplary embodiment of the present invention, the conversion item 950 may be provided on one region of a call screen as a soft key in an icon form, as an independently provided physical key for screen conversion, or through a certain button allotted on a touch pad. Further, although the conversion item 950 is displayed as illustrated in reference numeral 905 considering intuition, it may be provided as an item of an image corresponding to a previously executed application according to a user setting. For example, as the previously executed application is an e-mail, the conversion item 950 may be provided as an item of an image from instructing the e-mail. Further, when there are no previously executed applications (e.g., upon operating only a call function according to a general procedure) at the time of providing the call screen, display of the conversion item 950 may be omitted. Further, a location of the conversion item 950 may be one region of a call screen as illustrated in reference numeral 705, or a location corresponding to that of the call item 900 considering intuition of a user.

Subsequently, the controller 140 may convert the screen to an execution screen of an application as illustrated in reference numeral 701 in a state of reference numeral 705 and control to display the execution screen of an application. At this time, the controller 140 may continuously operate a call function to maintain a call connection state. Further, when the call screen is converted to an execution screen, the controller 140 may determine a screen conversion scheme. Further, the controller 140 may provide a total execution screen such as reference numeral 701 or simultaneously provide an execution screen and a call screen through divided regions according to a determined scheme.

Hereinafter, an exemplary embodiment of an operation for converting an application execution screen to a call screen and an exemplary embodiment of an operation for converting the call screen to an application execution screen will be described.

Figure 8:
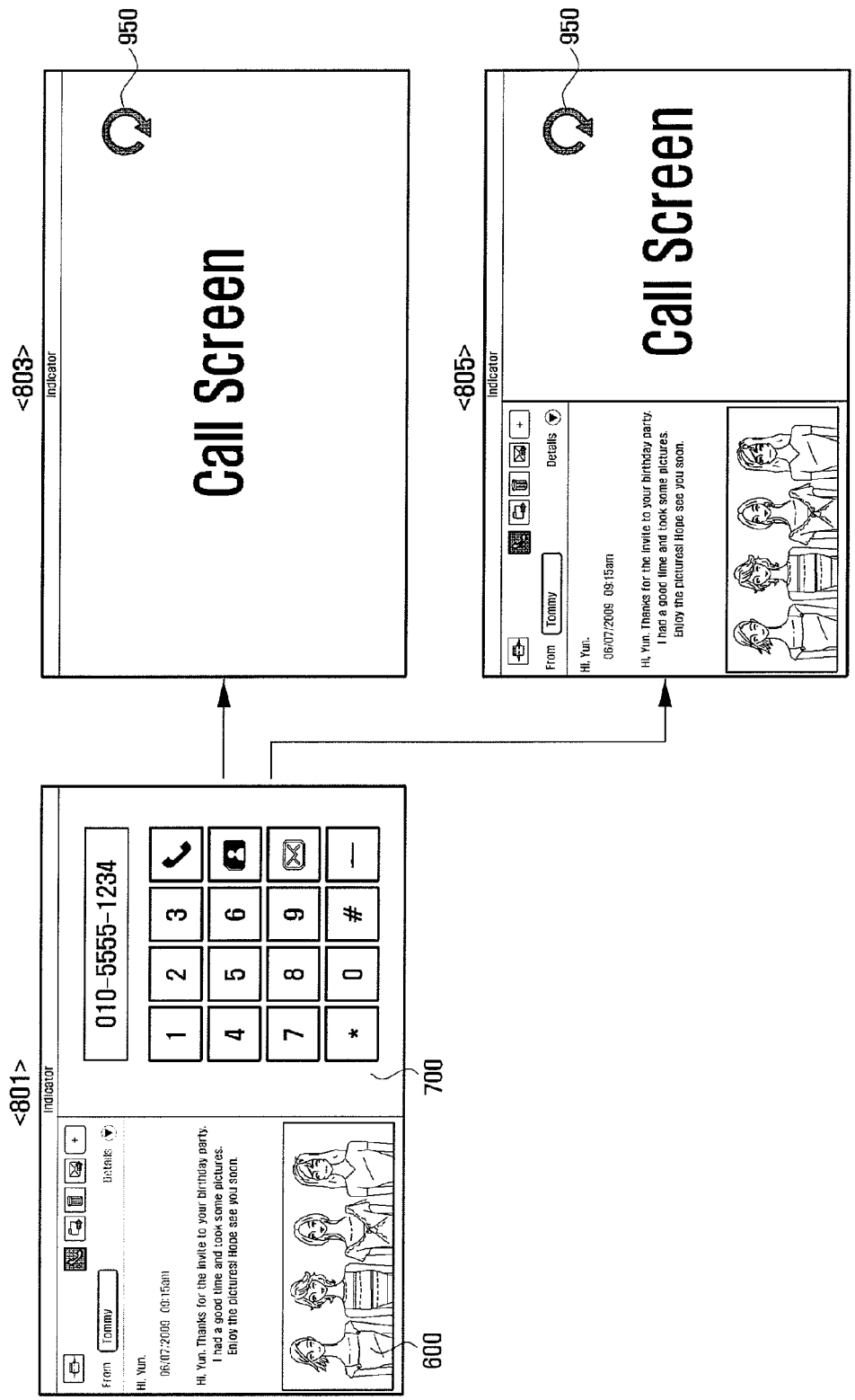
FIG. 8 and FIG. 9 are views illustrating a screen converting operation during a call function operation associated with an application in a portable terminal according to an exemplary embodiment of the present invention.

FIG. 8 is a view illustrating a call function operation associated with an application in a portable terminal according to an exemplary embodiment of the present invention.

Referring to FIG. 8, an example is shown of a screen converting operation where a call interface is called from an application execution screen (e.g., an e-mail execution screen) by an operation as described above with reference to FIG. 7, and then a screen is converted to a call screen according to execution of a call function.

First, it is assumed that a call interface screen is displayed as illustrated in reference numeral 801 by an operation as described above with reference to FIG. 7.

Next, a user may input an interaction (e.g., a tap interaction) based on a touch for executing a call function (e.g., a call transmission) in a state of reference numeral 801. For example, a user may input a tap interaction requesting a speech call transmission by a call button on a virtual key pad displayed on a dialer region 700 for executing a call function or image call transmission by an image call button.

Accordingly, the controller 140 may convert a screen to a screen of 803 or 805 according to the interaction from a state of reference numeral 801 and control to display the converted screen. Reference numeral 803 indicates an example where a call screen is displayed with a total screen (i.e., full screen form) when a screen is converted from a call interface screen. Reference numeral 805 indicates an example where an object screen having object information is displayed with a call screen when a screen is converted from the call interface screen.

For example, when an interaction for a call transmission is input while displaying a call interface screen for executing a call function as illustrated in reference numeral 801, the controller 140 may determine a screen providing scheme according to a screen conversion. Further, the controller 140 may determine to provide one of a full display of a call screen, a simultaneous display of an object screen and a call screen. The screen converting method will be described in an exemplary embodiment of an operation to be described below. Upon simultaneously displaying the object screen and the call screen, the controller 140 may determine a display scheme of object information displayed on the object region 600. For example, the controller 140 may construct an object region 600 with one of the screens of the object region 600 as illustrated in FIG. 4 to FIG. 6.

Further, as illustrated in reference numerals 803 and 805, when providing the call screen, a conversion item 950 for converting a screen to an execution screen of a previously executed application may be provided. Although FIG. 8 illustrates that the conversion item 950 is provided through a display unit 120 (in particular, in a call screen), screen conversion may be performed using a touch pad or an independently provided physical key besides the display unit 120. In this case, display of a conversion item 950 on a call screen may be omitted.

Figure 9:
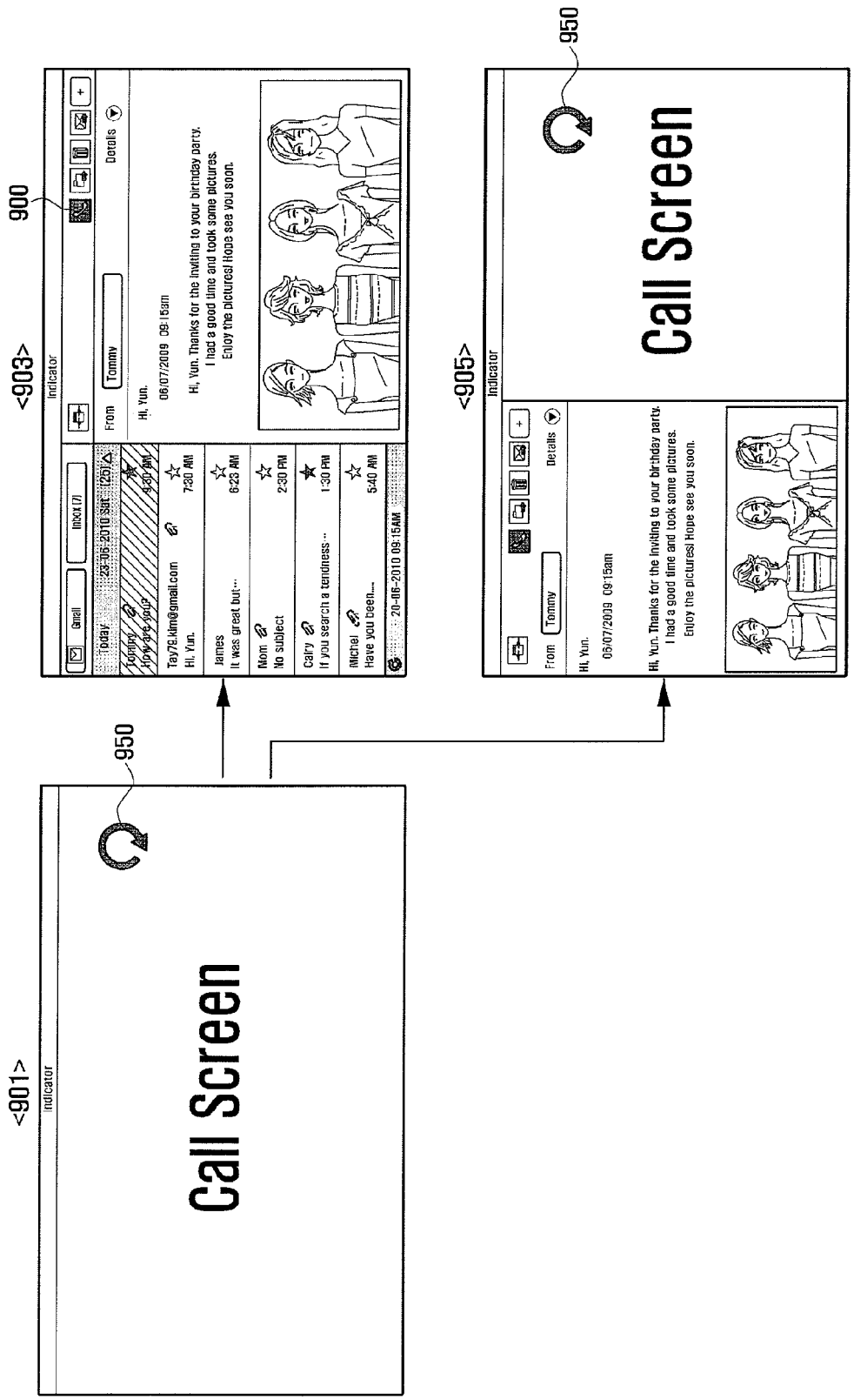

FIG. 9 is a view illustrating a call function operation associated with an application in a portable terminal according to another exemplary embodiment of the present invention.

Referring to FIG. 9, examples are shown of a screen for intuitively informing a user that a call function is being operated when a screen is converted to an application execution screen (e.g., an e-mail execution screen) in a state where a call screen is displayed by an operation as described above with reference to FIG. 8. Further, as illustrated in reference numeral 901, a conversion item 950 for converting a screen may be provided through the call screen. Although FIG. 9 illustrates that the conversion item 950 is provided through the display unit 120 (in particular, in a call screen), screen conversion may be performed using a separately provided touch pad or physical key besides the display unit 120. In this case, display of a conversion item 950 on a call screen may be omitted.

Subsequently, a user may input an interaction (e.g., a tap interaction) based on a touch selecting a conversion item 950 in a state of reference numeral 901. For example, the user may input a tap interaction selecting the conversion item 950 for converting to an e-mail execution screen while using a call function as illustrated in the call screen (e.g., a call screen according to a speech call function or an image call function).

First, it is assumed that a call interface screen is displayed as illustrated in reference numeral 901 by an operation as described above with reference to FIG. 8. At this time, the call screen may be displayed in one of a full screen form or a division screen form.

Next, a user may input an interaction (e.g., a tap interaction) based on a touch for converting a screen in a state of reference numeral 901. For example, the user may input a tap interaction by a conversion item 950 displayed on a call screen for converting a screen to a previously executed application execution screen (e.g., an e-mail execution screen).

Accordingly, the controller 140 may convert the screen to a screen of reference numeral 903 or 905 according to the interaction from a state of reference numeral 901 and control to display the converted screen. Reference numeral 903 indicates an example where a previously executed application execution screen is displayed as a full screen when a screen is converted on a call screen. Reference numeral 905 indicates an example where an object screen having object information is displayed with a call screen when a screen is converted from a call screen.

For example, when an interaction for screen conversion is input while displaying a call screen according to an operation of a call function as illustrated in reference numeral 901, the controller 140 may determine a screen providing scheme according to the screen conversion. Further, the controller 140 may determine to provide one of a full display of a previously executed application execution screen, a simultaneous display of an object screen and a call screen. The screen converting method will be described in an example of an operation described further below. Further, when simultaneously displaying an object screen and a call screen, the controller may determine a display scheme of object information displayed on the object region 600. For example, the controller 140 may construct an object region 600 with one of screens of an object region 600 as illustrated in FIG. 4 to FIG. 6.

FIG. 10 is a view illustrating a call function operation associated with an application in a portable terminal according to an exemplary embodiment of the present invention.

Referring to FIG. 10, examples are shown of a screen for intuitively reporting that a call function is currently being operated when a screen is converted to an application execution screen (e.g., an e-mail execution screen) in a state that the call screen is displayed by an operation as described above with reference to FIG. 7.

For example, reference numeral 1001 indicates an example of an e-mail execution screen before a call function is operated. Reference numeral 1003 indicates an example of a case where an e-mail execution screen is displayed by screen conversion like an example of FIG. 7 while providing a call screen according to a call function operation. In an exemplary embodiment of the present invention, as illustrated in reference numerals 1001 and 1003, a call function operation state may be intuitively displayed according to a result of a call item 900 being selected. For example, as illustrated in reference numeral 1001, when no effects are applied to the call item 900, only an execution screen according to execution of an application may be provided. Conversely, as illustrated in reference 1003, a certain effect (e.g., color change, item form change, etc.) is applied to the call item 900 to display it in a form other than a call item 900 of reference numeral 1001, so that it may indicate that a call function is being operated and an e-mail execution screen is provided by a screen conversion.

Accordingly, when a user inputs interaction to a call item 900 in a state of reference numeral 1001, a call interface screen may be provided as described above. Meanwhile, when the user inputs an interaction on the call item 900 in a state of reference numeral 1003, a call screen may be again provided by screen conversion. At this time, the call screen may be provided as a full screen or through a division region according to a previously displayed scheme.

Figure 11:
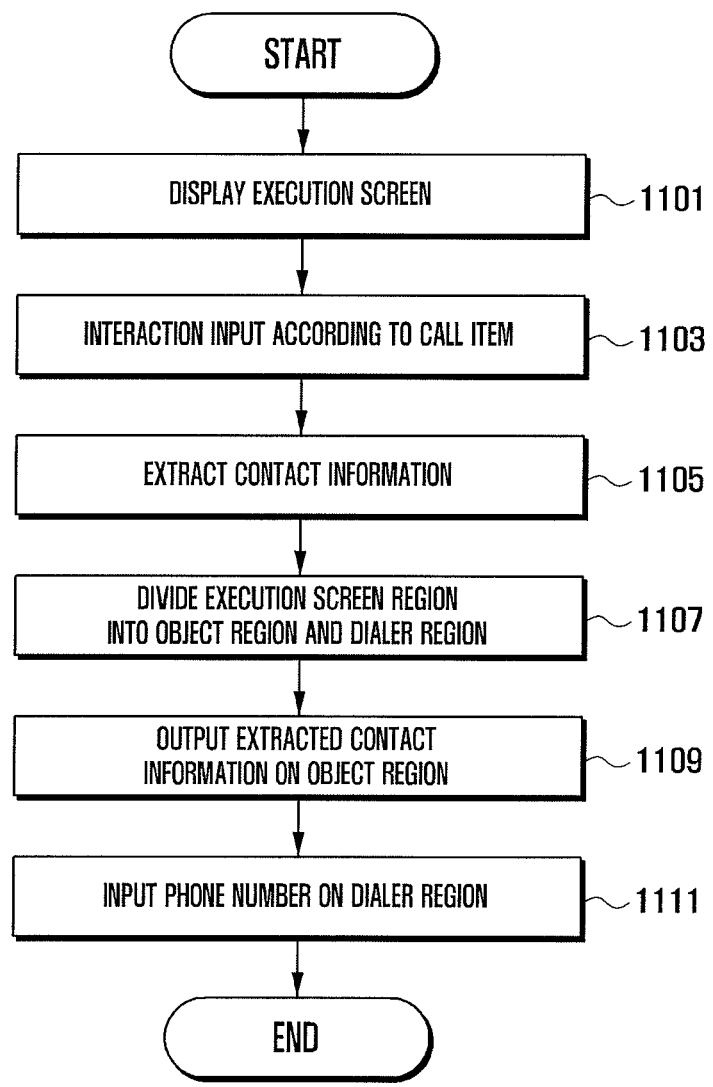
FIG. 11, FIG. 12, and FIG. 13 are flowcharts illustrating a method for operating a call function associated with an application in a portable terminal according to an exemplary embodiment of the present invention.

FIG. 11 is a flowchart illustrating a method for operating a call function associated with an application in a portable terminal according to an exemplary embodiment of the present invention. In particular, FIG. 11 illustrates a method for providing a call interface screen according to interaction input by a call item 900 on an application execution screen.

Referring to FIG. 11, a controller 140 may control to display an execution screen of a certain application in step 1101. For example, when a user generates an input selecting an application for an e-mail function in a portable terminal, the controller 140 may receive a corresponding input signal and control display of an execution screen (e.g., an e-mail execution screen) of a corresponding application. At this time, when providing the execution screen, the controller 140 may control to display a call item 900 on one region of the execution screen as previously described.

Next, the controller 140 may detect an interaction input selecting a call item 900 in a displayed state of the execution screen in step 1103. For example, when a user generates a touch based input selecting the call item 900 displayed on one region of an execution screen of a display unit 120, the display unit 120 generates and transfers an input signal corresponding to the input to the controller 140. When receiving the input signal, the controller 140 may detect that interaction according to the call item 900 is input.

Subsequently, if interaction according to the call item 900 is input to the controller, it may extract contact information in step 1105. For example, the controller 140 may extract contact information (e.g., registered contact information) stored in a memory 130 (in particular, a phone-book region) with respect to certain contact selected from an e-mail execution screen by a user. Further, the controller 140 may extract contact information (i.e., parsing contact information) from detail information displayed on a detail view region 500 with respect to a certain contact selected from an e-mail execution screen by a user. At this time, when extracting the registered contact information, if there are plural phone numbers, the controller 140 may extract a phone number set as a representative number among the plurality of phone numbers. Further, the controller 140 may extract contact information (e.g., registered contact information (e.g., a phone number) mapped to selected contact) of a contact selected upon extracting the parsing contact information, and extract contact information such as contact and phone numbers referred by parsing detail information.

Next, the controller 140 may divide the execution screen region 300 into an object region 600 and a dialer region 700 in step 1107. Subsequently, the controller 140 outputs the extracted contact information on the object region 600 as described previously in 1109. The controller may automatically input and display a phone number (e.g., a representative number) extracted with respect to the selected contact on the dialer region 700 in step 1111. At this time, when the phone number is not included in the contact information extracted at step 1105, the controller 140 may display the dialer region 700 (in particular, display region 800) as a blank and wait for user input.

Figure 12:
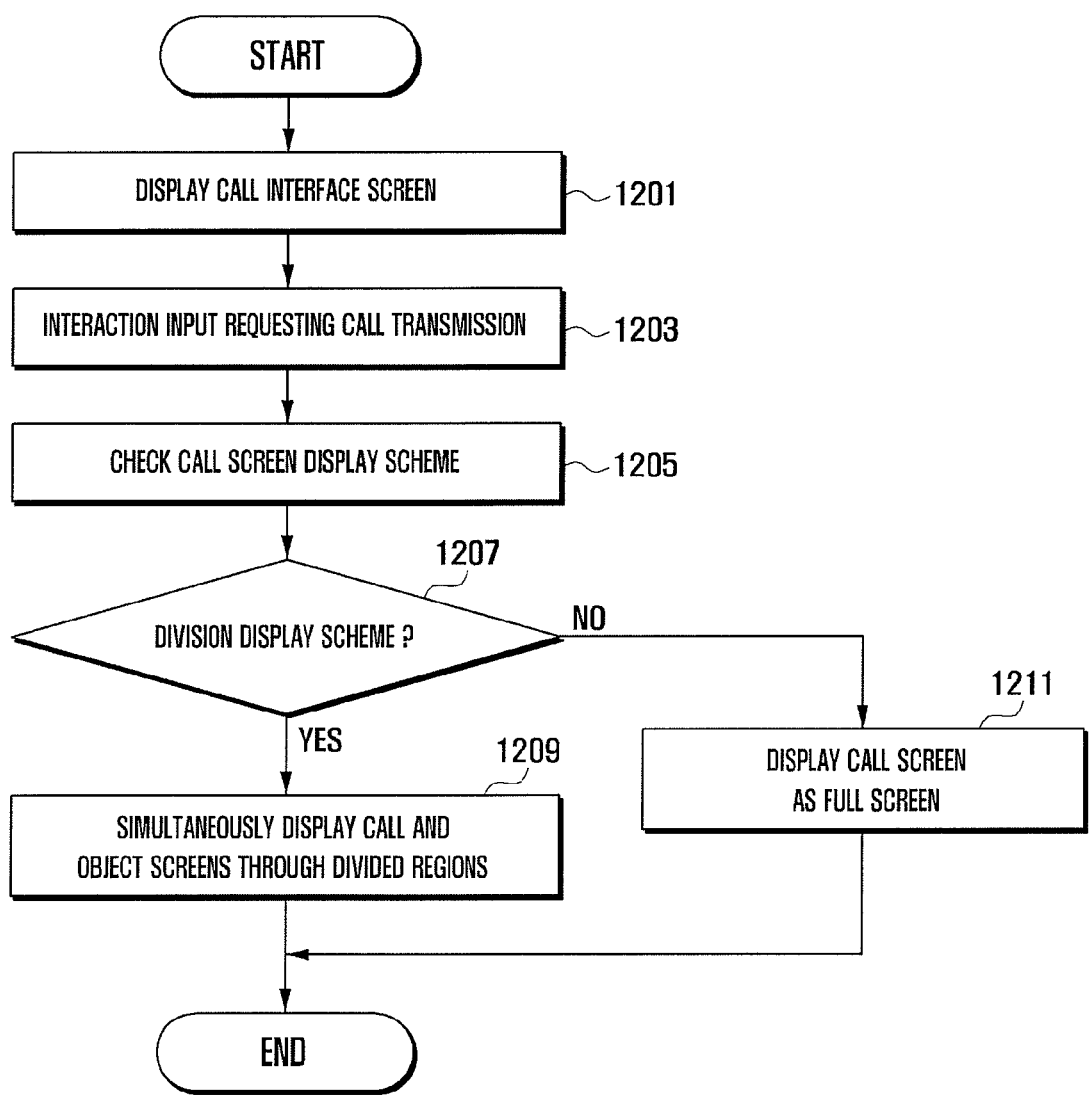

FIG. 12 is a flowchart illustrating a method for operating a call function associated with an application in a portable terminal according to another exemplary embodiment of the present invention. In particular, FIG. 12 illustrates a method for providing a call screen according to a call function operation in a state where a call interface screen is provided as shown in FIG. 11.

Referring to FIG. 12, a controller 140 may control call interface screen output according to an interaction through a call item 900 during an operation of a certain application as illustrated in FIG. 11 in step 1201. Next, the controller 140 may detect an interaction input requesting call transmission in a displayed state of the call interface screen in step 1203. For example, a user may input an interaction requesting call transmission (e.g., a speech call transmission by call button, an image call transmission by image call button) as automatically input information on the dialer region 700. At this time, when the dialer region 700 is provided as a blank, a user may input a certain phone number using a virtual key pad of a dialer region 700 and then input an interaction requesting call transmission.

Next, if an interaction for a call transmission is input, the controller 140 checks a call screen display scheme in step 1205. The controller 140 determines whether the call screen display scheme is a division display scheme or a full screen display scheme in step 1207.

When the call screen display scheme is the division display scheme (YES of step 1207), the controller 140 may simultaneously control to display a call screen and an object screen through divided regions in step 1209. For example, as illustrated in an example of reference numeral 805 of FIG. 8, the controller 140 may control to display an object screen on the object region 600 and a call screen on another divided region.

When the call screen display scheme is a full screen display scheme (NO of step 1207), the controller 140 may control to display the call screen as a full screen through one region in step 1211. For example, the controller 140 may control to display the call screen as a full screen form as illustrated in an example of reference numeral 803 of FIG. 8.

Figure 13:
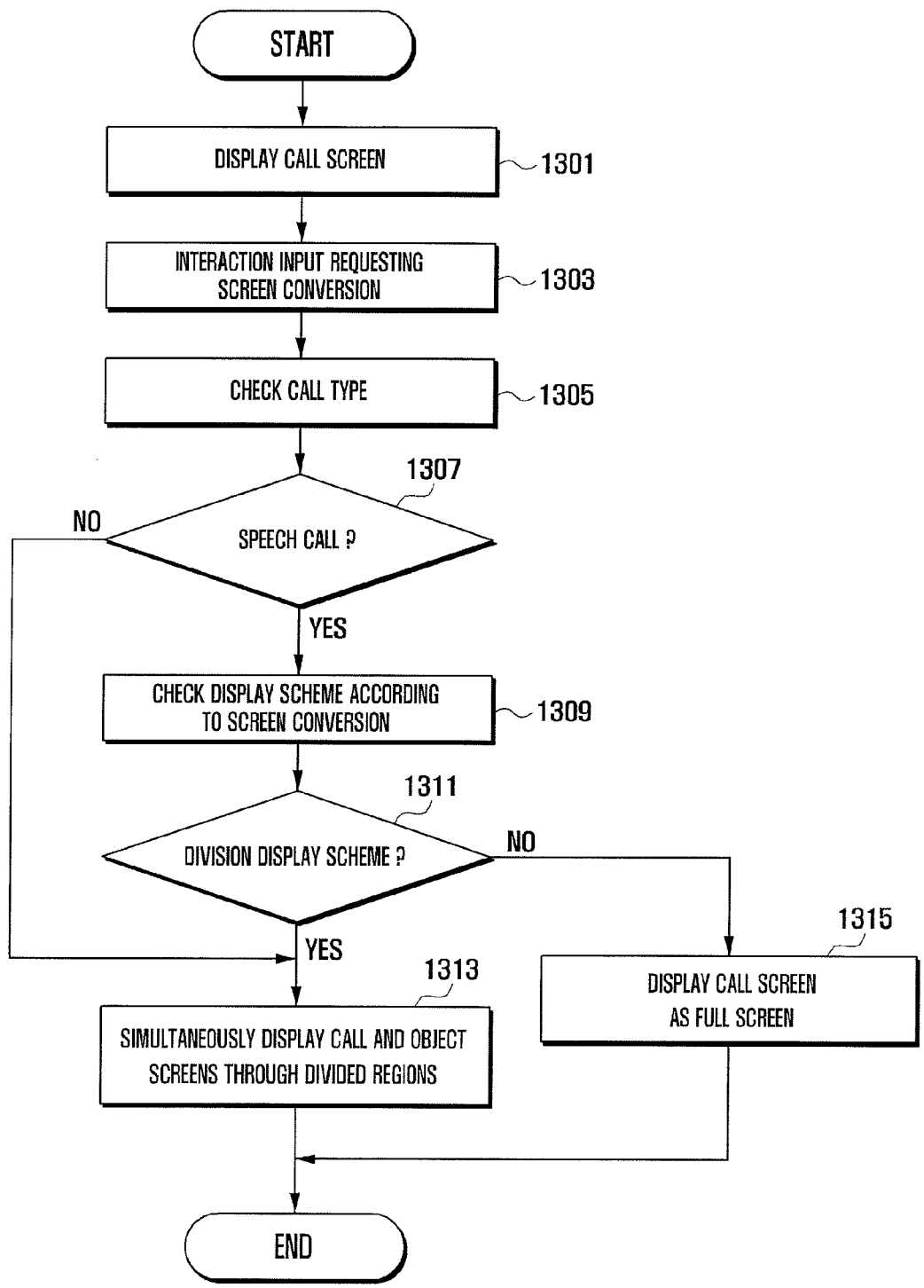

FIG. 13 is a flowchart illustrating a method for operating a call function associated with an application in a portable terminal according to still another exemplary embodiment of the present invention. In particular, FIG. 13 illustrates a method for converting a screen according to an interaction input through a conversion item 950 in a provided state of a call screen as in FIG. 12 and providing a corresponding screen.

Referring to FIG. 13, a controller 140 may control output of a call screen in one of a division display scheme or a full screen display scheme according to an interaction for call transmission during an operation of a call interface screen as described above in FIG. 12 in step 1301.

Next, the controller 140 may detect an interaction input requesting screen conversion in a displayed state of the call screen in step 1303. For example, a user may input a touch based interaction selecting a conversion item 950 provided on one region of a call screen for converting a screen to an e-mail execution screen executed before performing a call function in a displayed state of the call screen. At this time, the request of the screen conversion may be achieved by inputting a screen conversion interaction using a conversion item 950 of the call screen, a physical conversion key when a conversion item 950 is not provided or an external key such as a conversion key implemented on a touch pad.

Next, if a screen conversion interaction is input to the controller 140, the controller 140 checks a type of a current call in step 1305. The controller 140 may determine whether a call type according to an operation of a current call function is a speech call type or an image call type in step 1307.

When the call type is the image call (NO of step 1307), the controller 140 may directly go to step 1313. Meanwhile, when the call type is an speech call (YES of step 1307), the controller 140 checks a display scheme according to a screen conversion in step 1309. The controller 140 may determine whether a screen conversion scheme is a division display scheme or a full screen display scheme in step 1311.

Next, when the call type is the image call (YES of step 1307) or when the screen conversion scheme is the division display scheme (YES of step 1311), the controller 140 may simultaneously display a call screen and an object screen through divided regions in step 1313. For example, as illustrated in an example of reference numeral 905 of FIG. 9, the controller 140 may control to display an object screen on an object region 600 and a call screen on another divided region. At this time, the controller 140 applies and controls to display an effect to a call item 900 provided on a region on which the call screen is displayed or an object region. That is, the controller may apply and control to display an effect instructing that a call function is currently operated to the call item 900.

When the screen conversion scheme is a full screen display scheme (NO of step 1311), the controller 140 may control to display a previously executed application execution screen as a full screen in step 1315. For example, as illustrated in a previous example of reference numeral 903 of FIG. 9, the controller 140 may control to display an e-mail execution screen divided into a list view region 400 and a detail view region 500 as a full screen form. At this time, the controller 140 may apply and control to display an effect to a call item provided to an e-mail execution screen. That is, the controller 140 may apply and control to display an effect instructing that a call function is being currently operated to the call item 900.

Meanwhile, a method for operating a call function of a portable terminal according to an exemplary embodiment of the present invention as described above may be implemented in an executable program command form by various computer means and be recorded in a non-transitory computer readable recording medium. In this case, the non-transitory computer readable recording medium may include a program command, a data file, and a data structure individually or a combination thereof In the meantime, the program command recorded in the non-transitory recording medium may be specially designed or configured for the exemplary embodiments of the present invention or be known to a person having ordinary skill in a computer software field to be used.

The non-transitory computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of exemplary embodiments of the present invention, and a reverse operation thereof is the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a call function, the method comprising:
displaying an execution screen of an application and a call item provided on one region of the execution screen;
displaying a call interface in which a phone number is automatically input when an interaction is input to the call item; and
executing a call function using the phone number when a call transmission interaction is input from the call interface.

2. The method of claim 1, wherein the displaying of the call interface comprises:
extracting contact information registered with respect to a contact selected from a list view region of the execution screen when the interaction is input to the call item;
displaying the contact information on an object region of the call interface; and
automatically inputting and displaying a phone number of the contact information on a dialer region of the call interface.

3. The method of claim 1, wherein the displaying of the call interface comprises:
extracting a phone number with respect to a contact selected from a list view region of the execution screen and contact information from detail information of the contact displayed on a detail view region of the execution screen when the interaction is input to the call item;
displaying the contact information on an object region of the call interface; and
automatically inputting and displaying the phone number on a dialer region of the call interface.

4. The method of claim 1, wherein the displaying of the call interface comprises:
extracting a phone number with respect to a designated contact from the execution screen when the interaction is input to the call item;
displaying a screen of a list view region or a detail view region of the execution screen on an object region of the call interface; and
automatically inputting and displaying the phone number on a dialer region of the call interface.

5. The method of claim 1, wherein the executing of the call function comprises:
determining a display scheme of a call screen when the call transmission interaction is input; and
displaying the call screen in a full screen scheme or a division screen scheme according to the determined display scheme.

6. The method of claim 5, wherein the displaying of the call screen comprises simultaneously displaying a call screen and an object screen through a divided region when the display scheme is the division screen scheme, and displaying a call screen as a full screen form when the display scheme is a full screen display scheme.

7. The method of claim 5, further comprising providing a conversion item for converting a screen to the execution screen of the application previously executed when the call screen is displayed.

8. The method of claim 7, wherein the conversion item is provided in one of a separately provided physical key, a soft key of an icon form, and buttons allotted on a touch pad.

9. The method of claim 8, further comprising:
   determining a screen conversion scheme when a screen conversion interaction by the conversion item is input in a displayed state of the call screen; and
   displaying the execution screen in a full screen form or a division screen form according to the determined conversion scheme.

10. The method of claim 9, wherein the displaying of the execution screen comprises simultaneously displaying a call screen and an application execution screen in a division screen form when the display scheme is a division display scheme, and displaying the execution screen of the application in a full screen form when the display scheme is a full screen scheme.

11. The method of claim 9, wherein the displaying of the execution screen comprises applying and displaying an effect indicating that a call function is being executed to a call item provided on the one region of the execution screen when providing the execution screen.

12. The method of claim 9, further comprising:
   checking a call type of an executed call function when the screen conversion interaction is input;
   displaying the execution screen in a division screen form when the call type is an image call type; and
   determining the screen conversion scheme when the call type is a speech call type.

13. The method of claim 1, wherein the displaying of the call interface comprises:
   determining whether a contact designated in a list view region of the execution screen includes a phone number;
   firstly displaying a call interface in which a corresponding phone number is automatically input when the contact includes the phone number; and
   secondly displaying a blank call interface in which the phone number is not input when the contact does not include the phone number.

14. The method of claim 13, further comprising:
   inputting and displaying a phone number corresponding to a user input when the contact does not include the phone number; and
   registering the phone number as contact information of the contact when a call function is executed based on a phone number according to the user input.

15. The method of claim 13, further comprising inputting and displaying a corresponding phone number on a dialer region of a call interface when a certain phone number displayed on an object region of the call interface is selected after displaying a call interface according to the firstly displaying of the call interface or the secondly displaying of the blank call interface.

16. The method of claim 13, further comprising executing an application corresponding to contact information and displaying a corresponding screen when contact information displayed on an object region of the call interface is selected after displaying a call interface according to the firstly displaying of the call interface or the secondly displaying of the blank call interface.

17. The method of claim 1, wherein the displaying of the call item comprises:
   determining whether a contact designated in a list view region of the execution screen includes a phone number;
   activating and displaying the call item when the contact includes the phone number; and
   inactivating and displaying the call item when the contact does not include the phone number.

18. A portable terminal comprising:
   a display unit for displaying an execution screen of an application, a call interface screen for executing a call function, and a call screen according to execution of the call function; and
   a controller for constructing and controlling to display the call interface screen based on contact information extracted from the execution screen when a screen is converted to the call interface screen during an operation of the execution screen, and for constructing and controlling to display the call screen based on setting information when executing a call function on the call interface screen.

19. The portable terminal of claim 18, wherein the controller controls to display a call item for executing the call function on the execution screen, controls to display the extracted contact information when detecting call interaction by the call item on an object region of the call interface screen, and automatically inputs and controls to display a phone number of the contact information on a dialer region of the call interface screen.

20. The portable terminal of claim 18, wherein the controller determines a display scheme of the call interface screen or a call screen upon providing the call interface screen or the call screen, and controls a configuration of screen using at least two regions by dividing the call interface screen or the call screen, or a configuration of screen of a full screen form through total regions.

* * * * *